United States Patent
Thenthiruperai et al.

(10) Patent No.: US 7,891,011 B1
(45) Date of Patent: Feb. 15, 2011

(54) USER-BASED DIGITAL RIGHTS MANAGEMENT

(75) Inventors: Balaji S. Thenthiruperai, Overland Park, KS (US); Jeffery Mau, Kansas City, MO (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1127 days.

(21) Appl. No.: 11/126,729

(22) Filed: May 11, 2005

(51) Int. Cl.
*G06F 7/04* (2006.01)
*G06F 12/14* (2006.01)
*G06F 21/24* (2006.01)

(52) U.S. Cl. .................. 726/30; 726/17; 705/51; 705/57; 705/58; 705/59

(58) Field of Classification Search ............ 726/26–30, 726/32, 17; 713/201, 161; 380/201
See application file for complete search history.

(56) References Cited

U.S. PATENT DOCUMENTS

| | | | |
|---|---|---|---|
| 7,139,372 B2 * | 11/2006 | Chakravorty et al. ... | 379/114.01 |
| 7,203,966 B2 * | 4/2007 | Abburi et al. ................ | 726/29 |
| 7,444,388 B1 * | 10/2008 | Svendsen ..................... | 709/217 |
| 7,562,301 B1 * | 7/2009 | Wolff et al. .................. | 715/727 |
| 2002/0012432 A1 * | 1/2002 | England et al. ............. | 380/231 |
| 2002/0095384 A1 * | 7/2002 | Pestoni et al. .................. | 705/51 |
| 2004/0186853 A1 * | 9/2004 | Yamamoto et al. ........ | 707/104.1 |
| 2004/0243634 A1 * | 12/2004 | Levy ........................ | 707/104.1 |
| 2005/0044016 A1 * | 2/2005 | Irwin et al. ................... | 705/30 |
| 2005/0044361 A1 * | 2/2005 | Chang et al. ................. | 713/167 |
| 2006/0106726 A1 * | 5/2006 | Raley et al. ................... | 705/59 |
| 2007/0195685 A1 * | 8/2007 | Read ........................ | 369/275.3 |

\* cited by examiner

*Primary Examiner*—Taghi T Arani
*Assistant Examiner*—Thaddeus Plecha

(57) ABSTRACT

A digital content management system is provided in which a user's rights to access content are independent of the format in which the content is stored. A user receives a file containing electronic content, such as music or a ring tone, encoded in a particular format. The system determines the identity of that content, independent of the format in which the content is encoded. The system then determines whether the user has rights to that content. If so, the user is permitted to play the content. If the user later receives a different file that contains the same content but in a different format, the system determines that the different file encodes content that the user already has the right to play, and it allows the user to play the content in the second format.

11 Claims, 3 Drawing Sheets

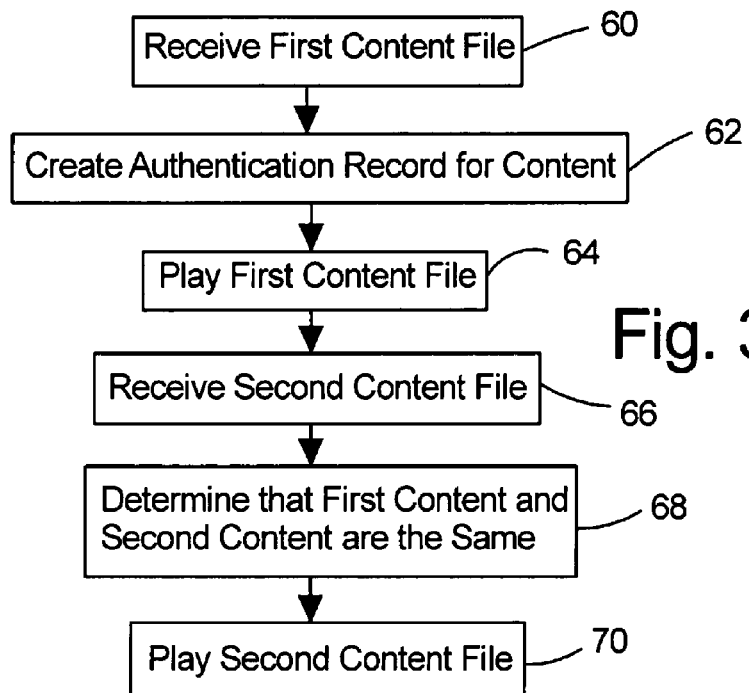
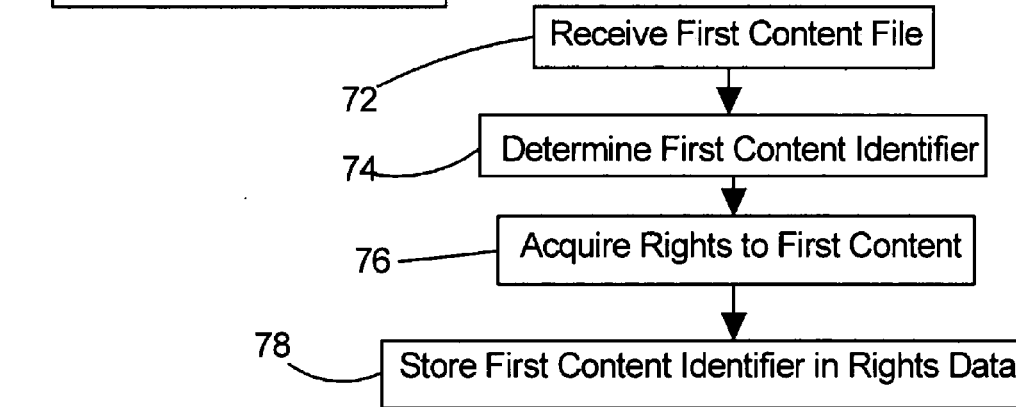
Fig. 3a
Fig. 3b

USER-BASED DIGITAL RIGHTS MANAGEMENT

BACKGROUND

The present invention relates to digital rights management. In particular, this invention relates to user-based rights management independent of format.

Digital content providers often wish to limit the distribution of the content they provide. In some instances, these limitations may help to preserve the value of the content by restricting the distribution of unlicensed copies. In other cases, these limitations can prevent the widespread distribution of proprietary materials, such as software programs developed for use within a particular company.

Digital content is often available in a variety of formats. For example, music files can be provided in MP3, WAV, Windows Media Audio, RealAudio, Vorbis, Advanced Audio Coding (AAC), or other formats. Similarly, ring tones and screen savers are available in different formats for different mobile telephones. As a result, a single song could be available in a variety of formats. In some cases, different media players such as personal computers, portable MP3 players, and car audio systems may support only some of those formats. This can pose difficulties to an individual intent on listening to digital music. He may, for example, download a song as a Windows Media Audio (WMA) file for use on a personal computer. If his portable MP3 player cannot decode WMA files, however, he cannot listen to that song on his MP3 player until he obtains a copy of the song in the MP3 format.

Even where there is a single file format that can be decoded by all of an individual's media players, it may be preferable to use different formats on different players. For example, MP3 files may be readable to all of the user's media players. The MP3 format, however, does not offer lossless compression. If the user has one device that can read a file format that uses lossless compression, he may prefer such files on that device.

These difficulties can be overcome in many instances. In the case of music files in the public domain, for example, the user may simply download the content in as many different formats as he needs. If he has appropriate software, he can transfer a file into different formats. These steps are little more than an inconvenience. If, on the other hand, the content is not in the public domain, the user may be required, whether by the terms of a license or by digital rights management software, to purchase multiple copies of the same content in different file formats.

A user encounters a similar difficulty if content he has purchased is later released in a more technically advanced file format. If he wishes to enjoy the content in the more advanced format (which may, for example have better sound quality, smaller file size, or other advantageous features), he is forced to purchase the content in the new format.

SUMMARY

A system is provided in which a users' rights to access content are independent of the format in which the content is stored. A user receives a file containing electronic content, such as music or a ring tone, encoded in a particular format. The system determines the identity of that content, independent of the format in which the content is encoded. The system then determines whether the user has rights to that content. If so, the user is permitted to play the content. If the user later receives a different file that contains the same content but in a different format, the system determines that the different file encodes content that the user already has the right to play, and it allows the user to play the content. As a result, the user need not acquire rights multiple times in order to play the same content in multiple formats.

BRIEF DESCRIPTION OF THE DRAWINGS

FIGS. 3a and 3b are schematic flow diagrams illustrating steps performed in an operation of a digital content management system.

DETAILED DESCRIPTION

I. Overview of an Exemplary Embodiment

Figure 1:
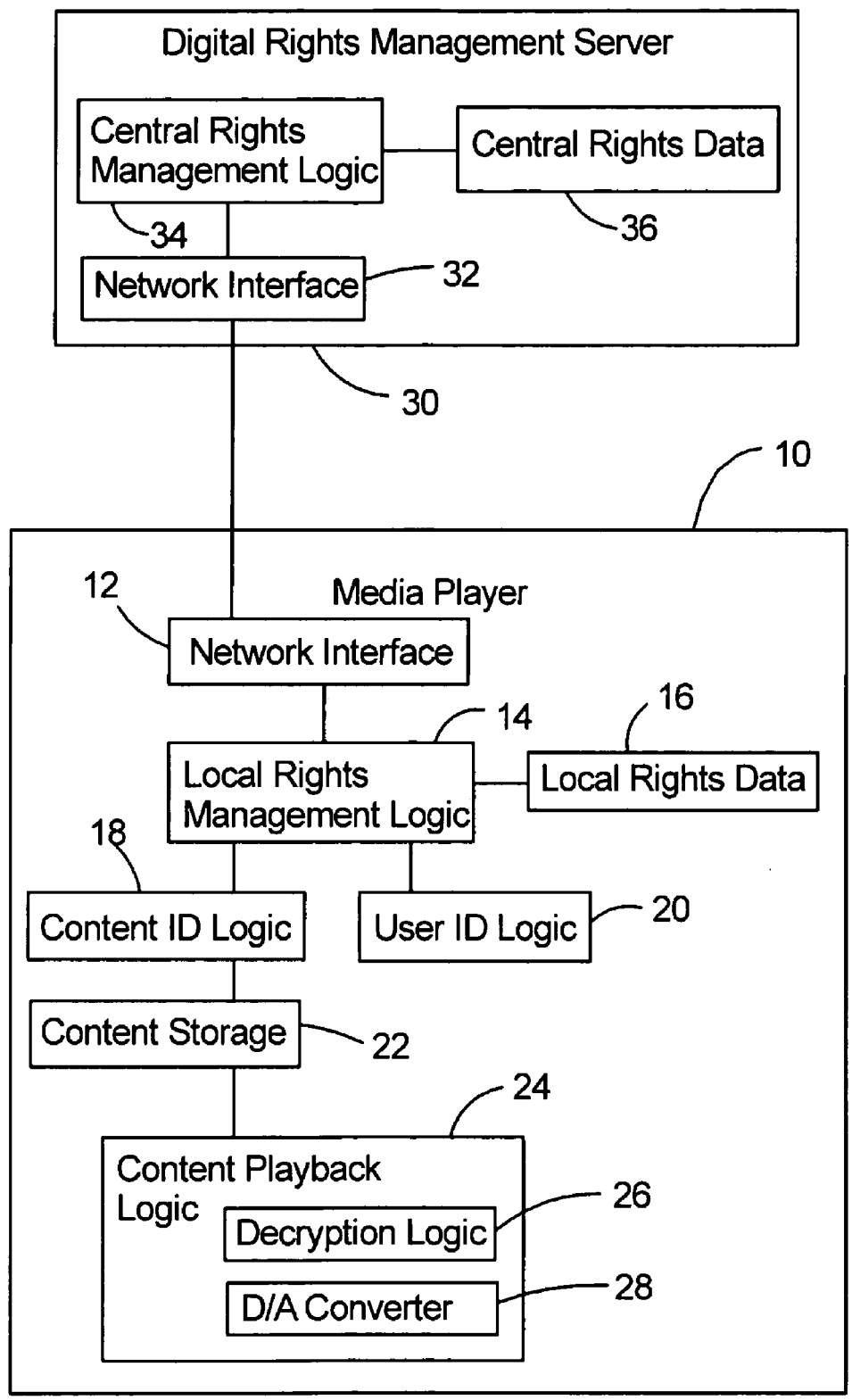
FIG. 1 is a schematic diagram illustrating the architecture of an exemplary digital content management system.

In a digital rights management system, a user acquires rights in particular content, rather than in a particular instantiation of that content. That is, instead of merely having the ability to use a particular file in which the content is encoded, the user is given the ability to use the content in a variety of formats.

A user acquires—by download, for example—a file encoding digital content. That user also obtains a right to play the content. An indication that the user has the right to play the content is stored in a database or other rights storage medium. Before the user is permitted to play the content, the system identifies the content and determines whether the user has rights to the content. The user may then acquire a second copy of the content in a different format. This may be, for example, a digital song file encoded in a different file format. The system identifies the second copy of the content and checks the database to determine whether the user has the right to play the content. If so, the user is permitted to play the content.

In this way, the user is able to play content in different formats without being required to separately purchase the content in each format. Because the capability to play certain content is tied to the user, rather than to a particular file, the system facilitates the use of content on various playback devices owned by the user, even where those different devices employ different file formats. Moreover, the content need not be instantiated in the form of a particular file. It may be, for example, a data structure. The data structure may be one of several data structures stored in a file and/or in memory.

A user having rights to content is permitted to play the content without inhibition. In some embodiments, a user without rights to the content may be permitted to play the content in an inhibited way. For example, the user may be permitted to play only the first several seconds of a media file, or he may be permitted to play the file only in a low-fidelity form. In this way, a user could sample content to determine whether it is worthwhile to purchase the right to play the content without inhibition.

A. Exemplary Techniques for Identifying Content

An important part of determining whether a user will be permitted to play a media file is identifying the content encoded in the file. This may be done using one or more of several techniques. In one embodiment, a content tag is encoded in the file itself. The content tag may encode bibliographic-style information, such as text identifying a song title, album name, artist name, publisher, and/or release date. Alternatively, or in addition, the content identifier may include alphanumeric information that can be linked to particular content, in the manner of a UPC code or an ISBN number.

Information other than a content tag may be used to identify the content. For example, the system may calculate a checksum or hash value from the file that contains the content. To identify the content, the system then looks up the calculated value to identify the content. The lookup may be done in a table stored at the user's device, or it may be done through other means, such as a query to an online content database. Preferably, where the device is not an Internet-based device, the content is identified from information stored on the device itself, whereas an Internet-capable device uses a combination of information stored on the device itself and information available online.

B. Exemplary Techniques for Identifying Users

An exemplary digital content management system also operates to identify the user. In this way, the rights in various content can be associated with the user. The user identity may be determined in various ways, including through the identity of the playback device. For example, a hard-coded serial number of the playback device may be associated with the user. In other embodiments, an account name under which the user has logged on to the playback device may be consulted to identify the user. Removable hardware devices such as, for example, a SIM (subscriber identity module) card or a "dongle" are among other means through which a user may be identified. In other instances, a user may be identified by the presence of identifying information on the users' playback device. This information could include, for example, a file containing a user profile, or a user's private key.

C. Exemplary Techniques for Acquiring Rights

A user may acquire the right to play content in one or more of a variety of ways. In one technique, the user purchases the right to play content electronically through an on-line vendor. In such an embodiment, the user sends identifying information to the vendor during an on-line transaction to purchase the right to play content. The vendor then associates in a database the user's identifying information with information identifying the purchased content.

In another embodiment, the user receives information indicating that he has a right to play the content. In such a case, information on the user's rights to the content may be stored in a database or table in the user's playback device. This table may be encrypted on the device, or otherwise rendered inaccessible to the user, so that the user is prohibited from changing or adding rights to the content.

In yet another embodiment, information on the user's rights may be stored in the same file that encodes the content itself. This information may be encoded in, for example, an encrypted portion of the file, or in a digital watermark on the file.

D. Exemplary Techniques for Verifying User Rights

Before a user attempts to play a particular content file, the system determines whether the user has the right to play the content. To do so, the system identifies the content and the user, and then determines the rights, if any, that the user has in the content. The system then allows the user to play the content in accordance with those rights. The process of determining the user's rights may be carried out in a variety of ways, depending, for example, on the location of the information tracking the user's rights.

Where the rights information is stored in a content file itself, the system consults the information in the content file to determine whether the user has the right to play the content. If the rights information is stored on the device itself, the system consults this local rights data to determine whether the user has the right to play the content. If the rights data is stored elsewhere, as in a central rights database accessible over a network, the system queries the central rights database to determine whether the user has the right to play the content.

To expedite the process of determining whether the user has rights to particular content, the system may cache information on the user's rights locally. After making a query to a network-based database, the system can store the result in a local file. In this way, queries to a network-based database need not be repeated.

II. A Digital Rights Management System

An exemplary digital content management system is illustrated in FIG. 1. A media player 10 and a digital rights management server 30 are used in a digital content management system. The media player 10 may be, for example, a mobile station such as a mobile telephone. As an alternative to a mobile telephone, the media player 10 may be, for example, an MP3 player, a personal digital assistant, or a personal computer.

The media player 10 is provided with content storage 22, which stores files that encode the digital content. The content storage 22 may be, for example, a hard drive, flash memory, or other digital storage medium. The media player is provided with content identification logic 18, which operates to identify the stored content. The media player is further provided with user identification logic 20, which identifies the user of the media player.

Local rights management logic 14 in the media player determines whether the user is permitted to play the content. It makes this determination based in part on the identification of the content furnished by the content identification logic 18 and the identification of the user furnished by the user identification logic 20. Based on this information, the local rights management logic 14 may consult local rights data 16 to determine whether there is an authorization record indicating that the user has the right to play the identified content. If there is an authorization record indicating that the user has the right to play the identified content, then content playback logic 24 is permitted to play the content.

Where the content includes an audio content, the media player 10 may be provided with a digital-to-analog converter 28. The digital-to-analog converter converts the digital content into an analog signal to be amplified and played for the user. Alternatively, a digital-to-analog converter is not needed if, for example, the media player supplies an output in a digital form for later conversion and amplification.

In a case where the content is in an encrypted format, the content playback logic 24 may include decryption logic 26. In such a case, the local rights management logic 14 may supply to the content playback logic 24 a key for the decryption of the content.

If no authorization record indicates that the user has the right to play the content, the media player queries the digital rights management server 30. Through its network interface 12, the media player 10 sends a query to a network interface 32 of the digital rights management server. The digital rights management server is provided with central rights management logic 34 and central rights data 36. The central rights data 36 makes an association between user identifiers with content identifiers in order to indicate whether a user has the right to play the identified content. The rights management logic 34 processes queries of the central rights data.

The digital rights management server 30 responds to the media player 10 with an indication of whether or not the user has the right to play the identified content. If the user does have the right to play the content, the media player 10 can make an indication of that fact in the local rights data 16. In this way, the local rights data 16 can act as a cache to reduce the number of requests sent over a network to the digital rights management server.

III. A Digital Rights Management Method

Figure 2:
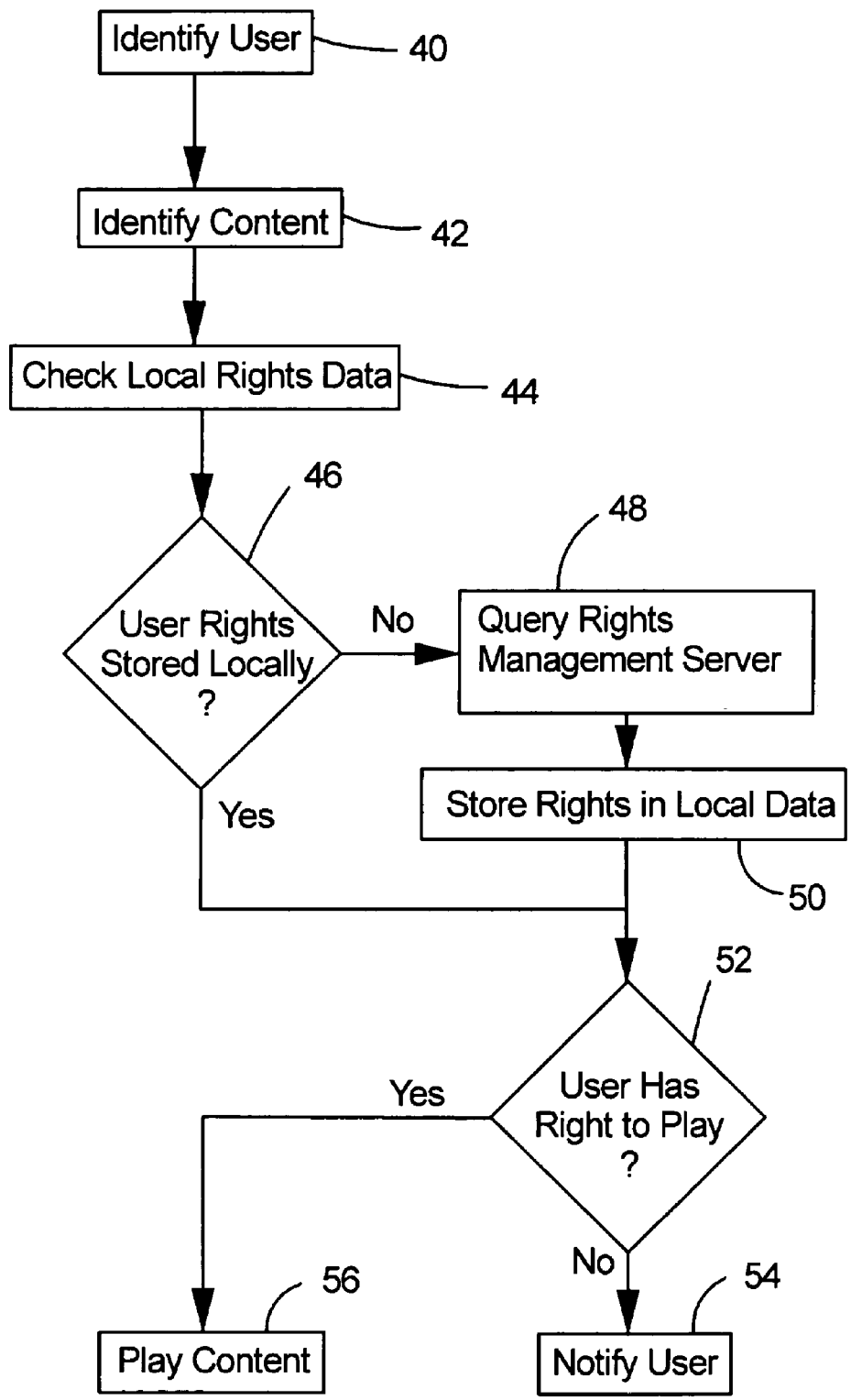
FIG. 2 is a schematic flow diagram illustrating an exemplary method performed by a digital content management system.

An exemplary method performed by a content management system is illustrated in FIG. 2. In step 40, the system identifies the user of the system. To do so, the system may operate according to one or more of the techniques described in section I.B, above. In step 42, the system identifies encoded content. The system may identify the content in response to, for example, the user's request to access that content. Alternatively, the system may identify the content in advance (for example, during a boot-up or initialization operation). To identify the content, the system may use one or more of the techniques described in section I.A, above.

Based on the identification of the user and of the content, the system, in step 44, checks locally-stored rights data to determine whether there is information available on the identified content. If not, the system in step 48 sends a query to a digital rights management server, such as the server 30 illustrated in FIG. 1. Based on the results of the query, the system in step 50 can store the user's rights in local rights data, to eliminate redundant queries in the future. Information stored in the local rights data may expire periodically, requiring the system to query the server from time to time to ensure that a user's rights have not changed.

In step 52, the system determines whether the user has the right to play the identified content. If so, the system in step 56 allows the content to be played. On the other hand, if the user does not have the right to play the identified content, then in step 54, the system notifies the user that the content cannot be played, and it denies access to the content. If the user is denied access to the content, the system may provide instruction to the user on how to gain rights to the content. For example, the system may direct the user to a Web page on which the rights can be purchased.

By associating user rights in particular content to the identity of the content itself, rather than a particular instantiation of the content in a file, the system allows users to acquire and play different files that encode the same content. Two exemplary methods according to which this may be performed are illustrated in FIGS. 3*a* and 3*b*.

According to FIG. 3*a*, a user receives a first content file in step 60. In step 62, the system creates an authorization record associated with the content. The authorization record may be, for example, an entry in the local rights data 16 (FIG. 1) or the central rights data 36 (FIG. 1). The authorization record includes a content identifier, and it indicates that the identified content may be played by a particular user.

In some embodiments, particularly where the authorization record is stored in central rights data, the authorization record may include both a user identifier and a content identifier. In other embodiments, the authorization record includes only a content identifier that appears in a data structure associated with a particular user (e.g., a list of content the user is permitted to play). Alternatively, the authorization record includes only a user identifier that appears in a data structure associated with particular content (e.g., a list of users who are permitted to play particular content).

Although the step of receiving the first content file (step 60) is illustrated as taking place before the creation of an authorization record (step 62), these steps may be performed in the reverse order. For example, a user may download an encoded content file, and later purchase the right to play the content, or the user may purchase the right to play particular content and only later download the encoded content file.

In step 64, the user plays the first content file. Later, the user acquires a second content file that encodes content in a different format from the first content file. In step 68, the system determines that, notwithstanding the different formats, the content encoded in the first file and the content encoded in the second file are the same content. This determination may be made based on, for example, determining a second content identifier from the second file, and comparing the second content identifier with the content identifier stored in (or associated with) the authentication record created in step 62.

After determining that the first and second content files encode the same content, the system plays the second content file in step 70. It should be noted that the playing of the first content file (step 64) and the playing of the second content file (step 70) may be performed by the same media player or by different media players.

Another method of operating the content management system is illustrated in FIG. 3*b*. In step 72, the user receives a first content file, encoding content in a first format. From the first content file, the system determines a first content identifier in step 74. In step 76, the user acquires rights in the first content. This may be performed as described in section I.C, above. After acquiring rights to the content, the content identifier is stored in rights data at step 78. This may be local or central rights data. In step 80, the user receives a second content file, encoding content in a second format. The second format may be different from the first format. In step 82, the system determines a content identifier from the second content file, and in step 84, the system finds the second content identifier in the rights data. If the second content identifier is the same as the first content identifier, the second content identifier will be found in the rights data. Only after finding the second content identifier in the rights data, the system plays the second content file (step 86).

It should be noted that, in the exemplary embodiment of FIG. 3*a*, only one authentication record need be created before the user is permitted to play two different files. Likewise, in FIG. 3*b*, only one content identifier need be stored in the rights data before the user is permitted to play two different files. Other records or identifiers may be added for different content, but where two or more files encode the same content, only one authentication record need be created. As a result, the same content may be acquired and played in a variety of formats, without requiring a user to obtain multiple copies.

IV. Alternative Embodiments

Certain implementations of the invention have been described above, but various others likewise fall within the scope of the present invention. As an example, the invention is not limited by the type of media player, which may be, among other things, a mobile telephone, a mobile and/or car-mounted MP3 player, or a personal computer. The network interfaces of the digital rights management server and the media player can communicate over different types of networks, such as the Internet or a private CDMA network.

The logical modules of the system, such as the central rights management logic, the local rights management logic, the content identification logic, the user identification logic, and the content playback logic may be implemented in hardware, in software, or in a combination of hardware and software. Where a module is implemented in software, a processor is provided, and the system keeps computer-readable instructions in a storage medium, such as a RAM or a ROM medium. The instructions direct the processor to carry out the operations described herein, and the processor operates to carry out the instructions.

The systems and methods described herein illustrate particular embodiments of the invention. The invention is not limited to these embodiments, but rather is defined by the following claims.

The invention claimed is:

1. A content management method comprising:
  receiving a first instantiation of first digital content at a device, wherein the first instantiation is encoded in a first format;
  determining an identity of the received first digital content;
  storing the identity of the received first digital content on the device;
  the device determining that a user has a right to play the first digital content by accessing a rights management logic;
  receiving a second instantiation of second digital content at the device, wherein the second digital content is encoded in a second format that is different from the first format;
  determining an identity of the received second digital content;
  the device determining whether the user has a right to play the received second digital content without accessing the rights management logic by comparing the determined identity of the received first digital content with the determined identity of the received second digital content to make a determination of whether the second digital content is the same as the first digital content, wherein comparing the determined identity of the received first digital content with the determined identity of the received second digital content comprises retrieving the stored identity of the received first digital content on the device and comparing the stored identity of the received first digital content with the determined identity of the received second digital content; and
  responsive to the determination being that the second digital content is the same as the first digital content, enabling the user to play the second digital content.

2. The method of claim 1, further comprising the step of playing the first digital content after a determination that the user has a right to play the first digital content.

3. The method of claim 1, wherein the first instantiation is a file.

4. The method of claim 1, wherein the first instantiation is a data structure.

5. The method of claim 1, wherein the first content is a ring tone.

6. The method of claim 1, wherein the first content is music.

7. The method of claim 1, wherein determining that a user has a right to play the first digital content includes:
  determining a user identifier; and
  determining that the received first digital content is associated with the user identifier.

8. The method of claim 1, wherein determining that a user has a right to play the first digital content by accessing a rights management logic comprises the device accessing local rights management logic stored on the device.

9. The method of claim 1, wherein determining that a user has a right to play the first digital content by accessing a rights management logic comprises:
  the device accessing local rights management logic stored on the device to determine whether the local rights management logic includes license information for the first digital content;
  responsive to the local rights management logic not including license information for the first digital content, the device querying a digital rights management server to determine whether the user has a right to play the first digital content;
  the device receiving a response from the digital rights management server regarding whether the user has a right to play the first digital content; and
  the device storing information relating to the response in the local rights management logic.

10. The method of claim 1, wherein determining that a user has a right to play the first digital content by accessing a rights management logic comprises accessing a digital rights management server via a network connection.

11. The method of claim 10, further comprising the device storing information relating to whether the user has a right to play the first digital content on the device.

* * * * *